United States Patent [19]

Saslaw et al.

[11] Patent Number: 5,009,904

[45] Date of Patent: Apr. 23, 1991

[54] METHOD FOR FRYING COMESTIBLES IN A MICROWAVE OVEN

[75] Inventors: Irving M. Saslaw, Woodcliff Lake, N.J.; Harry H. Topalian, Weston, Conn.; Joseph M. Rispoli, Massapequa Park, N.Y.

[73] Assignee: Saslaw & Topalian Associates, Inc., Port Chester, N.Y.

[21] Appl. No.: 590,963

[22] Filed: Oct. 1, 1990

Related U.S. Application Data

[62] Division of Ser. No. 440,800, Nov. 24, 1989.

[51] Int. Cl.$^5$ .............................................. A23L 1/00
[52] U.S. Cl. ..................................... 426/243; 426/438
[58] Field of Search .................... 426/243, 242, 438; 219/10.55 M

[56] References Cited

U.S. PATENT DOCUMENTS

| | | | |
|---|---|---|---|
| 2,997,566 | 8/1961 | Pierce et al. | 426/243 |
| 4,188,410 | 2/1980 | Rispoli et al. | 426/438 |
| 4,580,024 | 4/1986 | Thomas | 426/243 |

*Primary Examiner*—George Yeung

[57] ABSTRACT

A cooking composition for use in a microwave oven is provided comprised of from about 30 to 95 percent by weight of a frying oil or fat, from about 1.3 to 30 percent by weight of a water or oil-soluble food gum, and from about 0.05 to 2.5 percent by weight of an emulsifier. A method for use of the noted composition is also provided whereby the composition may be used to fry foods in a microwave oven.

28 Claims, No Drawings

METHOD FOR FRYING COMESTIBLES IN A MICROWAVE OVEN

This is a divisional of copending application(s) Ser. No. 07/440,800 filed on Nov. 24, 1989.

BACKGROUND OF THE PRESENT INVENTION

The present invention is directed to a microwave cooking composition and method of use thereof to fry comestibles in a microwave oven.

Microwave ovens have been used to cook comestibles for many years, resulting in a savings of time and effort with respect to such cooking efforts in comparison to cooking by conventional oven/cook top means.

One such conventional cooking method consists of frying a comestible in a hot frying oil or fat. However, the frying of food in a conventional manner involves the use of a frying oil or fat in amounts sufficient to substantially immerse the comestible during the frying process.

This frequently results in significant splattering of hot frying oil or fat as well as the absorption of substantial amounts of the frying oil or fat by the comestible during frying.

Hence, numerous safety and health concerns are raised in connection with the conventional frying of foods.

One attempt to address such concerns is disclosed in U.S. Pat. No. 4,188,410. This patent discloses a frying composition which is employed in conventional stovetop frying which comprises a frying oil or fat and an amount of an emulsifier effective to foam the oil or fat during the frying method. The patent discloses that the emulsifier may be employed in the form of a dry coating which is coated onto the comestible prior to frying.

As a result of the presence of the emulsifier, a foam results during frying which is stated to at least substantially envelop the comestible to be fried, thus enabling significantly reduced amounts of frying oil or fat to be used.

The patent teaches that the emulsifier is employed in an amount generally within the range of from 3 to 35 percent by weight of the cooking oil composition.

It has been discovered that the teachings of U.S. Pat. No. 4,188,410 are not directly transferable to microwave cooking methods.

It is known that it is not possible to fry comestibles in a microwave by conventional methods involving the heating of the comestible in a frying oil or fat. While the oil or fat may become heated as a result of the application of microwave energy, the comestible will generally cook independently as a result of also being subjected to microwave energy while at the same time absorbing undesirably large amounts of the oil or fat. Also, no frying can occur as the oil or fat is not heated sufficiently in the microwave in comparison to that achieved by heating on a conventional cooktop.

The end result is a soggy or rubbery comestible that does not exhibit the desirable crispiness of conventional fried foods.

It has also been determined that the presence of an emulsifier such as lecithin in amounts of at least 3 percent by weight undesirably darkens the comestible while yielding an off-flavor.

It has further been determined, due to the different methods of heating involved in cooktop frying versus microwave cooking, that any foam which may form during microwave cooking due to the presence of an emulsifier is highly transient by nature and not sufficiently stable to enable satisfactory frying to be accomplished.

OBJECTS AND SUMMARY OF THE PRESENT INVENTION

It is thus one object of the present invention to provide a cooking composition for use in microwave cooking which enables a comestible to be fried in a microwave oven.

It is also an object of the present invention to provide a method of frying comestibles in a microwave oven.

In accordance with the present invention, there is thus provided a microwave cooking composition comprising:

(a) from about 30 to 95 percent by weight of a frying oil or fat;

(b) from about 1.3 to 30 percent by weight of a water or oil-soluble food gum; and (c) from about 0.05 to 2.5 percent by weight of an emulsifier.

In accordance with the present invention, there is also provided a method for frying comestibles in a microwave oven comprising (a) contacting said comestible with a microwave cooking composition comprising from about 30 to 95 percent by weight of a frying oil or fat, from about 2 to 30 percent by weight of a water- or oil-soluble food gum, and from about 0.05 to 2.5 percent by weight of an emulsifier; and (b) applying microwave energy to said comestible while in contact with said cooking composition.

DETAILED DESCRIPTION OF THE INVENTION

The present invention is directed to an improved ion which is especially formulated for use in a microwave oven and which enables a comestible to be fried by the application of microwave energy.

By way of basic definition, the improved cooking composition comprises (a) from about 30 to 95 percent by weight of a frying oil or fat; (b) from about 1.3 to 30 percent by weight of a water or oil-soluble food gum; and (c) from about 0.05 to 2.5 percent by weight of an emulsifier.

Additional optional components of the cooking composition of the present invention include a source of a reducing sugar and various types of seasonings.

The improved cooking composition of the present invention readily assumes a highly foamed state during the application of microwave energy thereto when in contact with a comestible. As a result, significantly lower amounts of a frying oil or fat are necessary during the frying of the comestible in the microwave oven.

The presence of an emulsifier in the microwave cooking composition encourages a foam to form during the cooking process as a result of the formation of an emulsion comprised of moisture derived from the comestible and the fat or oil also present. The foam which forms is comprised of a mass of bubbles which surround the comestible and conduct heat to the comestible.

It has been discovered that the composition disclosed by U.S. Pat. No. 4,188,410 cannot be acceptably employed in connection with microwave cooking for various reasons.

Primarily, the emulsifier (lecithin) and oil composition of the patent yields a foam which is too transient by nature and insufficiently stable to result in a comestible which is adequately fried in a microwave oven.

It has been surprisingly discovered that an acceptable microwave frying composition results which includes both a frying oil or fat and an emulsifier if a water- or oil-soluble food gum is also present. The food gum enhances the formation of a foam during the cooking process while stabilizing the foam which is formed.

Further, and surprisingly so, the presence of the food gum enables significantly reduced amounts of an emulsifier to be present while still achieving the results desired.

Thus, the combined action of the food gum and the emulsifier enables the desirable results of the present invention to be achieved.

It has been discovered that an emulsifier need only be present in an amount in the range of from about 0.05 to 2.5 percent by weight, based on the weight of the cooking composition. Preferably, the emulsifier need only be present in an amount in the range of from about 0.1 to 1.5 percent by weight.

While a variety of food-grade emulsifiers are believed to be suitable for use in the present invention, lecithin is the preferred emulsifer for use in the present invention.

The frying fat or oil which is employed may be any frying fat or oil which is conventionally employed to fry foods on a cooktop. Such frying fats or oils include but are not limited to those derived from plants, animals, fruits, vegetables, seeds, etc. with exemplary fats or oils including lard, tallow, butterfat, olive oil, palm oil, coconut oil, cottonseed oil, peanut oil, sesame oil, corn oil, soybean oil, fish oil, oleo oil, etc. Unsaturated and cholesterol-free oils are preferred for use in the present invention from a dietary standpoint.

A frying oil is normally liquid, while a frying fat is normally solid at room temperature. While various nutritional distinctions may exist between the various fats and oils listed above, the noted fats and oils are substantially equivalent from a functional frying standpoint.

The frying oil or fat is present in an amount ranging from about 30 to 95 percent by weight based on the weight of the cooking composition, and preferably ranging from about 60 to 80 percent by weight.

The food gum which is employed may be any water- or oil-soluble food gum which is conventionally employed in foods for a variety of purposes.

Such gums include but are not limited to water soluble food gums derived from cellulose, oil soluble food gums, gel forming gums and thermal gelling gums. Gum damar, an exemplary oil-soluble gum suitable for use in the present invention, is available from Folexco, Inc. of New Jersey.

In particular, methylcellulose and hydrodroxypropyl methylcellulose gums are preferred for use in the present invention.

Such gums are present in an amount in the range of from about 1.3 to 30 percent by weight of the cooking composition, based on the use of a 10 percent aqueous or oil based solution of the gum. Preferably, the gum is present in an amount in the range of from about 10-15 percent by weight, based on a 10 percent solution of the gum.

The thermal gel structure formed by such gums is an oil-soluble shield that helps to retain natural juices while blocking oil absorption. During cooling the gel effect reverses so gumminess does not become a problem.

Desirably, a source of a reducing sugar is also present in the cooking composition in order to enhance the flavor of the fried comestible and provide a golden appearance to the fried comestible.

Such sources of a reducing sugar, when present, are present in an amount ranging up to about 15 percent by weight, and preferably ranging from about 0.5 to 5 percent by weight, based on the weight of the cooking composition.

Exemplary sources of reducing sugars include but are not limited to honey, maple syrup, corn syrup, molasses and mixtures thereof, with honey being preferred.

Conventional seasonings may also be employed with satisfaction in amounts effective to yield the desired result. Such seasonings include but are not limited to butter, margarine, black pepper, salt, butter substitutes, hard fats, etc. Such seasonings will generally be employed in amounts which vary with the respective seasoning. For instance, a seasoning such as pepper or salt will generally be employed in an amount of up to about 1.0 percent by weight, while a seasoning such as butter may be employed in an amount up to about 20 percent by weight.

Such amounts are clearly not critical and may be varied based on the seasoning employed and the ultimate taste effect desired to be achieved The improved cooking composition of the present invention may be employed as follows in order to fry a comestible in a microwave oven with an exemplary cooking composition of the present invention comprised of the following ingredients: corn oil (77.93 wt. %), 10% Methocel solution (12.99 wt. %), lightly salted butter (6.49 wt. %), honey (1.29 wt. %), purified liquid lecithin (1.17 wt. %) and oleoresin black pepper (0.13 wt. %).

The cooking composition may be formed by dispersing the Methocel solution (50 grams) in 500 cc of hot water (190 to 200 F.) and blended in a colloid mill. The remaining ingredients are thus added to corn oil in a colloid mill in the following order and thoroughly dispersed therein: lecithin, honey, black pepper, and melted butter.

The aqueous Methocel solution is subsequently dispersed within and blended with the corn oil admixture until uniform.

A suitable comestible is selected for frying in the microwave. While chicken is the preferred comestible for use in the present invention, other comestibles such as meats, fish and vegetables may be used with success. The scope of the present invention is believed to be without limit from the standpoint of the types of comestibles which may be fried.

With respect to the microwave frying of chicken, the chicken is initially coated with flour and permitted to stand as in conventional frying.

One-half cup of a cooking composition defined above is poured into a glass baking dish approximately 12"×6"×2.5" in dimension. The oil in the baking dish is preheated by application of microwave energy for 15 minutes at a high setting. At the conclusion of the preheating step, the cooking oil attained a temperature of approximately 350° F.

It is preferred to preheat the cooking oil to a temperature in the range of about 300 to 425° F. prior to the contacting of the comestible therewith. For instance, the cooking composition may be preheated at a high setting for approximately 10–15 minutes to achieve the desired preheating result (i.e., to reach a temperature of at least about 300° F.).

Upon completion of the preheating step, the flour-coated chicken is placed in the cooking oil, skin side down.

The chicken is microwaved in a microwave oven for 7 minutes at high setting, and for 1 additional minute at the same setting after being turned over in the baking dish.

Upon completion of the two cooking cycles, the chicken assumes a fried appearance with crispy browned skin and is ready to be served. Desirably, the skin of the fried chicken is not oily in texture or appearance.

What is claimed is:

1. A method for frying comestibles in a microwave oven comprising the steps of:
   (a) contacting said comestible with a microwave cooking composition comprising from about 30 to 95 percent by weight of a frying oil or fat, up to about 30 percent by weight of a water- or oil-soluble food gum, and from about 0.05 to 2.5 percent by weight of an emulsifier; and
   (b) applying microwave energy to said comestible while in contact with said cooking composition,
   with the proviso that said food gum is present in said cooking composition in an amount sufficient to enhance the formation of a foam during the application of said microwave energy while stabilizing the thus-formed foam, whereby a fried comestible is obtained.

2. The method of claim 1 wherein said microwave cooking composition is preheated prior to contacting said comestible.

3. The method of claim 2 wherein said microwave cooking composition is preheated to a temperature of at least 300 ° F. prior to said contacting.

4. The method of claim 1 wherein said cooking composition comprises from about 60 to 80 percent by weight of said frying oil or fat.

5. The method of claim 1 wherein said frying oil or fat comprises corn oil.

6. The method of claim 1 wherein said frying oil or fat is selected from the group consisting of vegetable oils, animal oils and seed oils.

7. The method of claim 1 wherein said food gum comprises hydroxypropyl methylcellulose.

8. The method of claim 1 wherein said food gum comprises methylcellulose.

9. The method of claim 1 wherein said food gum comprises gum damar.

10. The method of claim 1 wherein said food gum is present in said cooking composition in an amount in the range of from about 1.3 to 30 percent by weight.

11. The method of claim 1 wherein said emulsifier is present in said cooking composition in an amount in the range of from about 0.1 to 0.5 percent by weight.

12. The method of claim 1 wherein said emulsifier comprises lecithin.

13. The method of claim 1 wherein said cooking composition further comprises a reducing sugar source.

14. The method of claim 12 wherein said source of said reducing sugar is selected from the group consisting of honey, maple syrup, corn syrup and molasses.

15. The method of claim 13 wherein said source of reducing sugar is honey.

16. The method of claim 13 wherein said source of reducing sugar is present in an amount up to about 15 percent by weight.

17. The method of claim 16 wherein said source of said reducing sugar is present in an amount ranging from about 0.5 to 5 percent by weight.

18. The method of claim 1 wherein said composition further comprises at least one seasoning.

19. The method of claim 1 wherein said composition further comprises at least one component selected from the group consisting of butter, margarine, black pepper, butter substitutes, hard fats, and salt.

20. The method for frying comestibles in a microwave oven comprising the steps of:
   (a) contacting said comestible with a microwave cooking composition comprising from about 30 to 95 percent by weight of a frying oil or fat, a water- or oil-soluble food gum, and from about 0.05 to 2.5 percent by weight of an emulsifier; and
   (b) applying microwave energy to said comestible while in contact with said cooking composition,
   with the proviso that said food gum is present in said cooking composition in an amount sufficient to enhance the formation of a foam during the application of said microwave energy while stabilizing the thus-formed foam, whereby a crispy, fried comestible is obtained.

21. The method of claim 20 wherein said food gum is present in said composition in an amount in the range of from about 1.3 to 30 percent by weight.

22. The method of claim 20 wherein said microwave cooking composition is preheated prior to contacting said comestible.

23. The method of claim 20 wherein said microwave cooking composition is preheated to a temperature in the range of at least 300° F. prior to said contacting.

24. The method of claim 20 wherein said cooking composition comprises from about 60 to 80 percent by weight of said frying oil or fat.

25. The method of claim 20 wherein said frying oil or fat comprises corn oil.

26. The method of claim 20 wherein said frying oil or fat is selected from the group consisting of vegetable oils, animal oils and seed oils.

27. The method of claim 20 wherein said emulsifier is present in said cooking composition in an amount in the range of from about 0.1 to 0.5 percent by weight.

28. The method of claim 20 wherein said comestible is chicken.

* * * * *